N. W. AKIMOFF.
AZIMUTH ADJUSTING MECHANISM.
APPLICATION FILED JULY 20, 1916.

1,262,594.

Patented Apr. 9, 1918.

Witnesses
Thos. Riemann
A. B. Jones

Inventor
Nicholas W. Akimoff,
By J. Stuart Freeman,
Attorney

UNITED STATES PATENT OFFICE.

NICHOLAS W. AKIMOFF, OF PHILADELPHIA, PENNSYLVANIA, ASSIGNOR TO DYNAMIC BALANCING MACHINE COMPANY, OF PHILADELPHIA, PENNSYLVANIA, A CORPORATION OF PENNSYLVANIA.

AZIMUTH-ADJUSTING MECHANISM.

1,262,594.  Specification of Letters Patent.  Patented Apr. 9, 1918.

Application filed July 20, 1916. Serial No. 110,276.

*To all whom it may concern:*

Be it known that I, NICHOLAS W. AKIMOFF, a subject of the Czar of Russia, residing at Philadelphia, in the county of Philadelphia and State of Pennsylvania, have invented certain new and useful Improvements in Azimuth-Adjusting Mechanisms, of which the following is a specification.

The object of this invention is to provide an improved mechanism for the purpose of altering the relative positions of the azimuths of a plurality of rotatable bodies coupled together to rotate in synchronism, while they are in motion.

Another object is to provide a device of this character with a type of mechanism whereby it automatically remains locked in a given position, until positively actuated by hand, mechanical, or electrical means.

And another object is to provide a device of this character which requires the least possible space, the fewest number of parts and these of the simplest and most efficient construction and operation.

Still further objects consist in the provision of a device connecting two rotatable bodies actuated by any suitable power, said device comprising a pair of gears, or their equivalent, connected to rotate as or in accordance with the respective bodies, and a pinion between said gears having an axis movable in an orbit so as to alter the circumferential position of one of said gears with respect to the other, while the same are in motion or at rest, thereby altering the relation of the azimuths of the respective bodies.

Figure 1:
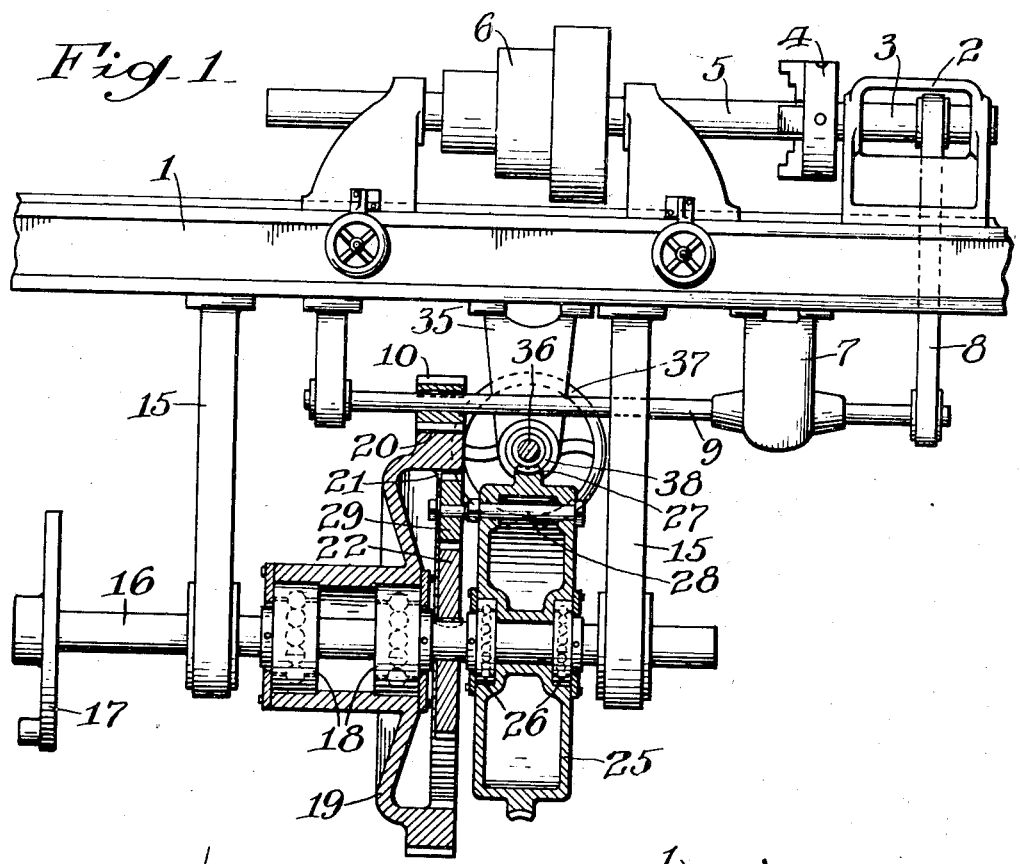
Figure 2:
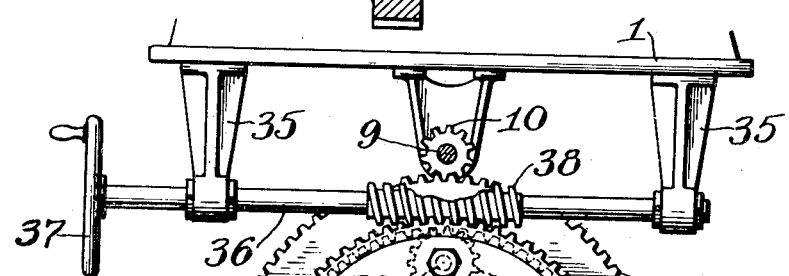
Figure 2:
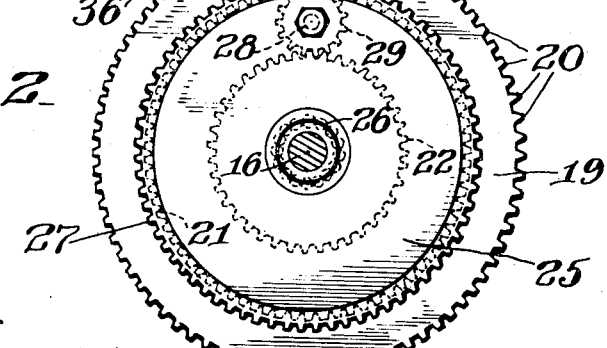

Further objects and details of the construction and operation of the device in its preferred form are fully described in the following specification, when read in conjunction with the accompanying drawings in which Figure 1 is a longitudinal vertical section of the device; and Fig. 2 is an end elevation of the same.

Referring to the drawings, a bed 1 is shown upon which is mounted a head stock 2, rotatably supporting a live spindle 3, to which is secured a suitable chuck 4, adapted to grip a shaft 5 upon which is mounted a body 6. Also mounted upon said bed is a motor 7, or other suitable driving means, and the same is connected to actuate the said spindle by means of a belt 8 or the like, while said motor also drives a shaft 9, carrying a pinion 10.

Further supported by the bed 1 upon spaced hangers 15 is a rotatable shaft 16, carrying a body 17 secured thereto to revolve therewith, while mounted to rotate freely upon said shaft by means of ball-bearings 18 is a gear wheel 19 provided with both external and internal teeth 20 and 21, respectively. A second gear wheel 22 is firmly secured to the shaft 16, making said gears concentric with each other.

A preferably hollow frame 25 is also mounted to revolve freely upon the shaft 16 by means of a set of ball-bearings 26, and said frame is provided upon its periphery with a continuous series of worm teeth 27, while extending through said frame and firmly secured thereto is one or a plurality of pins 28 upon which is mounted to rotate as many idler pinions 29, meshing both with the inner teeth 21 of the gear 19 and the gear 22.

Supported by brackets 35 adjacent to and transversely of the bed 1 is a shaft 36, carrying a suitable hand-wheel 37 and worm 38, the latter coöperating with the teeth 27 of the frame 25. By this construction, with the said frame stationary, the motor drives the bodies 6 and 17 in a predetermined relation as to speed and circumferential position, depending only upon the ratios of the various power transmission members employed, such as gears, pinions, belts, pulleys, etc.

And furthermore, either while the mechanism is in motion, or at rest, a movement of the hand-wheel 37 and the worm 38 moves the frame 25, thereby shifting the pin 28, and pinion carried thereupon, in an orbit about the shaft 16 as an axis. Thus, a movement of the last-named shaft with respect to the gear 19, and body 6 connected thereto, is brought about with the result that the relative circumferential positions of the said two bodies are changed, this condition obtaining as long as such movement continues, and the arrangement of worm and adjacent gear acting as a lock against an accidental continuance of said change as soon as the power is removed from said shaft.

The invention as described is well adapted for use upon, or as a part of, various devices, whether synchronous motion between two bodies is to be normally maintained, or otherwise.

Under conditions in which it is used simply as a power transmission system, a great latitude is possible between the extreme speeds attainable on the part of one of the said bodies, while the other is being run at a constant rate, and to this end the shaft 36 may be revolved in either direction and at variable speeds by any suitable driving means, such for instance as an electric motor.

It is furthermore desired to specify that the invention anticipates the omission of any of the power transmission members described, while maintaining the fundamental requirement of two bodies, connected by an idler mounted upon an axis movable in an orbit. Thus, in the interpretation of the appended claims, gear 19 may be one of the bodies and the gear 22 the other, the remaining mechanical elements upon either side being simply trains of means for the transmission of the movement of said gears and representative of any similar arrangement that may be desired.

Having thus described my invention, what I claim and desire to protect by Letters Patent of the United States is:

1. The combination of a shaft with a gear keyed thereto, an internally and externally toothed gear revolubly mounted upon said shaft, a member also revolubly mounted upon said shaft, a pinion carried by said member and extending between and coöperating with said first gear and the internal teeth of said second gear, a driving pinion coöperating with the external teeth of said second gear, and means to move said member to shift the axis of said first pinion in an orbit.

2. The combination of a shaft with a gear keyed thereto, an internally and externally toothed gear revolubly mounted upon said shaft, a member mounted to revolve in axial alinement with said shaft, a pinion carried by said member and extending between and coöperating with said first gear and the internal teeth of said second gear, a driving pinion coöperating with the external teeth of said second gear, and means to move said member to shift the axis of said first pinion in an orbit.

In testimony whereof I have affixed my signature.

NICHOLAS W. AKIMOFF.